United States Patent [19]

Horch et al.

[11] Patent Number: 4,911,900

[45] Date of Patent: Mar. 27, 1990

[54] METHOD OF REMOVING NITROGEN OXIDES FROM A FLUE GAS STREAM

[75] Inventors: Klaus Horch, Krefeld; Hans-Paul Hagenmaier, Tübingen, both of Fed. Rep. of Germany

[73] Assignee: Deutsche Babcock Anlagen Aktiengesellschaft, Oberhausen, Fed. Rep. of Germany

[21] Appl. No.: 249,541

[22] Filed: Sep. 26, 1988

[30] Foreign Application Priority Data

Sep. 26, 1987 [DE] Fed. Rep. of Germany ....... 3732560

[51] Int. Cl.$^4$ .............................................. C01B 21/00
[52] U.S. Cl. .................................................... 423/235
[58] Field of Search ............................ 423/235, 235 D

[56] References Cited

FOREIGN PATENT DOCUMENTS

| 0264041 | 4/1988 | European Pat. Off. . |
| 2411672 | 9/1974 | Fed. Rep. of Germany . |
| 3032927 | 2/1980 | Fed. Rep. of Germany . |
| 3526756 | 1/1987 | Fed. Rep. of Germany . |

Primary Examiner—Gregory A. Heller
Attorney, Agent, or Firm—Herbert Dubno

[57] ABSTRACT

In the selective reduction of nitrogen oxides of flue gases with ammonia, the ammonia is added as ammonia water upstream of the reduction zone. Residual gas phase ammonia and ammonia compounds collected with the flyash serve as recycled ammonia sources and ammonia is formed from them and, in an ammoniacal solution, is added to the ammonia water supply vessel.

17 Claims, 2 Drawing Sheets

METHOD OF REMOVING NITROGEN OXIDES FROM A FLUE GAS STREAM

FIELD OF THE INVENTION

The present invention relates to the removal of nitrogen oxides from a flue gas stream utilizing a selective and preferably noncatalytic reduction of the nitrogen oxides by ammonia.

BACKGROUND OF THE INVENTION

It is known that nitrogen oxides can be removed from a flue gas stream before it is released into the atmosphere as a method of avoiding environmental pollution, by a selective noncatalytic reduction of the nitrogen oxides with ammonia.

Especially when a noncatalytic reduction is to be carried out, it is found that nonreacted ammonium can form a residue in the flue gas stream of the reaction chamber and might be discharged into the atmosphere. Another portion of the ammonia can react with acid compounds of the flue gas to form solid ammonium compounds, such as ammonium sulfate and ammonium chloride which are collected together with the flyash or otherwise may be released into the atmosphere.

In EP-A No. 2-0 264 041 a process is described for the recovery of ammonia in which the nonreacted ammonia and ammonium chloride are scrubbed from the flue gas and ammonia is driven with air out of the scrubbing liquid. The ammonia enriched air is either introduced into the combustion zone or upstream of the catalytic or noncatalytic reduction zone into the flue gas passage so that the recycled ammonia also participates in the nitrogen oxide reduction process.

When the recycled ammonia is fed into the combustion there is the danger that it will meet high temperatures at which it can be burned so that the nitrogen oxide levels will not be reduced, but rather are increased. When the recycled ammonia is blown into the flue gas, carrier air together with entrained water vapor may cause problems in the subsequent treatment of the flue gas.

German Patent Document No. 35 26 756 describes a process for the removal of ammonia residues from the flyash of a flue gas which can be then used for the selective reduction of nitrogen oxides. Here the flyash separated from the flue gas is treated with hot treating gas, e.g. air heated to 700° to 800° C., so that the ammonia is driven off into the treating gas. The ammonia is then recovered from the treating gas or the treating gas with the ammonia is introduced into the reaction zone charged with a catalyst for promoting the nitrogen oxide reduction.

A similar process in which the treating gas is flue gas at a temperature 350° to 700° C. is described in German Patent Document No. 30 32 927.

German Patent Document No. 24 11 672 indicates that in the selective noncatalytic reduction of nitrogen oxides in flue gas use may be made of ammonia which has been dissolved in water, i.e. ammonia water, and German patent Document No. 38 00 730 indicates that an aqueous ammonia solution can be used for both catalytic and noncatalytic processes. In the prior processes, where recovery of ammonia from the flue gas downstream of the reduction zone is effected, the quantity of recycled ammonia is dependent upon the operating conditions and it has been difficult to coordinate both the recycled and fresh ammonia additions to the flue gas. It can be safely said, therefore, that reliable control of the earlier processes could not be ensured by the techniques which were previously used.

OBJECTS OF THE INVENTION

It is, therefore, the principal object of the present invention to provide an improved method of and selectively reducing nitrogen oxides in a flue gas whereby control problems with respect to the recycling of ammonia can be eliminated.

Another object of this invention is to provide an improved process in which the ammonia is recycled, whereby the drawbacks of earlier systems are obviated.

SUMMARY OF THE INVENTION

These objects and others which will become more apparent hereinafter are attained, in accordance with the present invention, in a method which comprises the steps of:

(a) introducing ammonia water into the flue gas and effecting a selective reduction of the nitrogen oxides with ammonia of the ammonia water in a reaction zone downstream of the introduction of the ammonia water into the flue gas;

(b) recovering an ammoniacal component selected from the group which consists of unreacted ammonia and ammonium reaction products from the flue gas downstream of the reaction zone;

(c) transforming the component into an aqueous ammoniacal solution;

(d) feeding the aqueous ammoniacal solution into a supply vessel containing the ammonia water; and (e) supplying to step (a) and the flue gas, the said ammonia water introduced into the flue gas from the supply vessel.

It will be immediately apparent, with the invention, that the sole source of ammonia which is introduced into the flue gas stream of the reduction zone can thus be the ammonia solution or ammonia water supply vessel.

Advantageously, step (b) comprises:

($b_1$) scrubbing gaseous ammonia from the flue gas with an aqueous scrubbing liquid in a scrubbing zone, and ($b_2$) driving ammonia from the scrubbing liquid into a gas phase; and in step (c), the step of scrubbing ammonia from the gas phase with water to which an acid is added to form the ammoniacal solution.

This, of course, is applicable in the case in which the flue gas contains ammonia compounds which can be collected with the flue gas.

Step (b) can comprise the steps of:

($b_3$) collecting flyash from the flue gas, and ($b_4$) driving ammonia from the recovered flyash by a heating thereof into a gas phase; and in step (c), the step of scrubbing ammonia from the gas phase with water to which an acid is added to form the ammoniacal solution.

This is used when a portion of the $NH_3$ appears as $NH_4$ salts in the flyash which is separated from the flue gas.

In a preferred embodiment, of course, ammonia is recovered from both the flyash and gas phase. It has been found to be advantageous to eliminate the scrubbing liquid remaining after the removal of ammonia by spraying the scrubbing liquid into the flue gas for evaporation therein.

Preferably, the flyash is heated by indirect heating to a temperature of 250° to 500° C. in an atmosphere with an oxygen deficiency, i.e. an oxygen content of less than 2 volume percent. Direct heating of the flyash with a hot carrier gas can also be used.

BRIEF DESCRIPTION OF THE DRAWINGS

The above objects, features and advantages of our invention will become more readily apparent from the following description, reference being made to the accompanying highly diagrammatic drawing in which.

SPECIFIC DESCRIPTION

Figure 1:
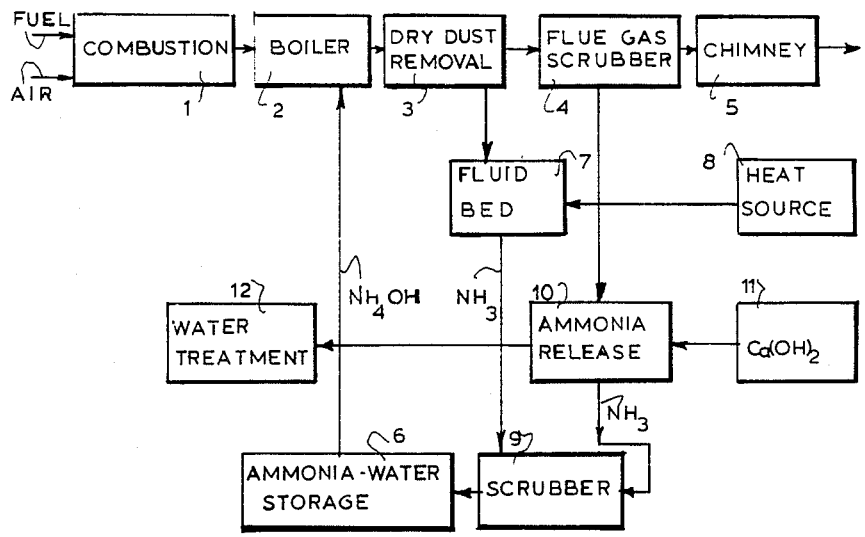
FIGS. 1–4 are flow diagrams illustrating variants of the process of the invention.

In the various FIGURES, the same reference numerals have been used to designate corresponding stages and it will be understood that the description of these stages in the one FIGURE will apply as well to the stages as illustrated in other FIGURES.

In FIG. 1, a flue gas stream is generated in a combustion chamber 1, e.g. of an industrial installation such as a fossil fuel power plant by the burning of a fuel with air and heat is abstracted from the flue gas in, for example, a boiler 2.

The flue gas then passes through a dry dust removal unit 3 and generally the flue gas path will also include a flue gas scrubber 4 before the flue gas is discharged into the atmosphere from a chimney or stack 5.

In accordance with the invention, a supply vessel 6 is provided and contains ammonia water, i.e. a solution of ammonia in water. The ammonia water is the source of ammonia for the noncatalytic reduction of nitrogen oxides in the flue gas and is added in the region of the boiler 2 to the flue gas stream.

The vessel 6 is filled in a controlled manner with the ammonia water, i.e. the level and concentration of the ammonia water in the supply vessel can be maintained constant and the quantity of the water added to the flue gas stream may be proportioned to the nitrogen oxide concentration and volume rate of flow. Directly downstream of the location of ammonia water added to the flue gas, is formed in the boiler 2, a reaction zone in which a homogeneous gas phase noncatalytic reduction of the nitrogen oxides is effected with the ammonia from the ammonia water so that the reaction products are nitrogen and water vapor.

From the dry dust removal unit 3, flyash containing small amounts of ammonium salts is recovered and introduced into the fluidized bed apparatus 7 representing the unit in which ammonia is driven off from the flyash.

The stripping of ammonia from the flyash can be effected in the apparatus 7 by direct heating with a hot gas at 700° to 800° C. For this purpose, a hot gas generator 8 is connected to the unit 7. The ammonia-containing gas is then supplied to the ammonia scrubber 9 from which the ammoniacal solution is fed to the ammonia water storage vessel 6.

In the flue gas scrubber 4 an aqueous scrubbing liquid is used to remove gaseous contaminants. The scrubbing liquid can be acidified, i.e. acid can be added to it. The scrubbing liquid removes, for example, hydrogen chloride. Gaseous residual ammonia is also recovered in the scrubbing liquid. While the scrubber 4 has been shown as a single unit, it will be understood to also represent a plurality of scrubbing stages and some of these stages may, if desired, involve scrubbing with basic scrubbing liquids, for example, to remove sulfur dioxide. The additional scrubbing stages do not bear upon the present invention and hence are not described here.

From the scrubbing liquid cycle, a portion of the acidic scrubbing liquid is branched and supplied to a heated vessel 10 constituting an ammonia-reduction reactor. The scrubbing liquid can be reacted with basic substances, for example milk of lime, in the reactor 10. The milk of lime is supplied from the vessel 11.

By the addition of the basic substances, the pH of the scrubbing liquid is brought to at least 10, preferably at least 10.5 and by heating to a temperature of at least 60° C. for a residence time of at least 30 minutes, preferably 50 to 70 minutes, the ammonia is driven from the scrubbing liquid.

The gaseous ammonia that is thus released, like the ammonia from the flue bed 7, is supplied to the ammonia scrubber to provide the ammonia water which is fed in part to the vessel 6. The latter, of course, is also supplied with makeup ammonia water as required. The water which has been freed from ammonia in the ammonia stripper 10 is subjected to waste water treatment at 12.

Figure 2:
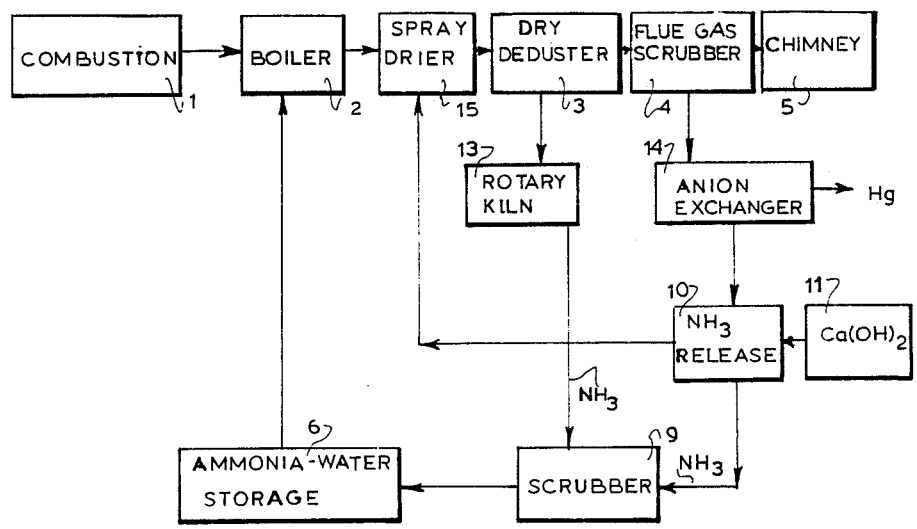

The method of FIG. 2 differs somewhat from that of FIG. 1 in that the stripping of ammonia from a flyash is effected in an apparatus 13 by an indirect heating method, for example the apparatus 13 may be an indirectly heated rotary kiln or furnace. The heat treatment of the flyash is effected under an oxygen deficiency, i.e. under an atmosphere less than 2 percent oxygen at a temperature of 250° to 500° C. at which halogenated aromatic compounds including dioxin can be decomposed. The ammonia gas which then results is fed to the ammonia scrubber 9.

The acidified scrubbing liquid which is branched from the recirculated scrubbing liquid of the scrubber 4 is, in this embodiment, subjected to an ion exchange in the ion exchanger 14. In this unit, mercury which has been scrubbed out of the flue gas can be removed before the scrubbing liquid is fed to the stripper 10. The scrubbing liquid from the stripper 10 is introduced into the flue gas at a spray dryer, i.e. is sprayed into the flue gas between the boiler 2 and the dry dust remover 3. In the spray dryer 15, the water is evaporated and the dry residues are collected in the unit 13. In case the scrubbing liquid contains an ammonia residue, this likewise is transformed to the gas phase and is scrubbed out at the scrubber 9 downstream along the flue gas path.

Figure 3:
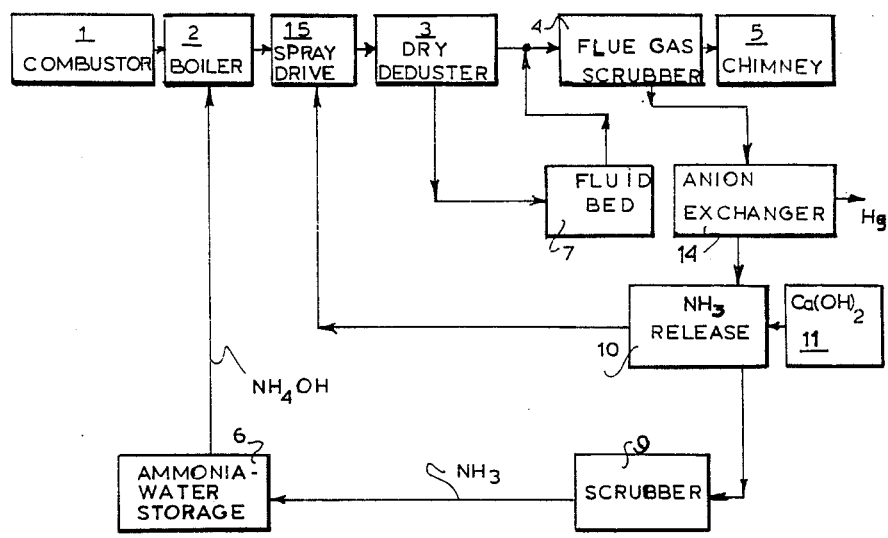

In the variant of FIG. 3, the fluidized bed apparatus 7 returns the gas phase ammonia to the flue gas stream between the dry dust remover 3 and the scrubber 4 so that this ammonia is recovered in the scrubber 4 and the stripper 10, etc. associated therewith.

Figure 4:
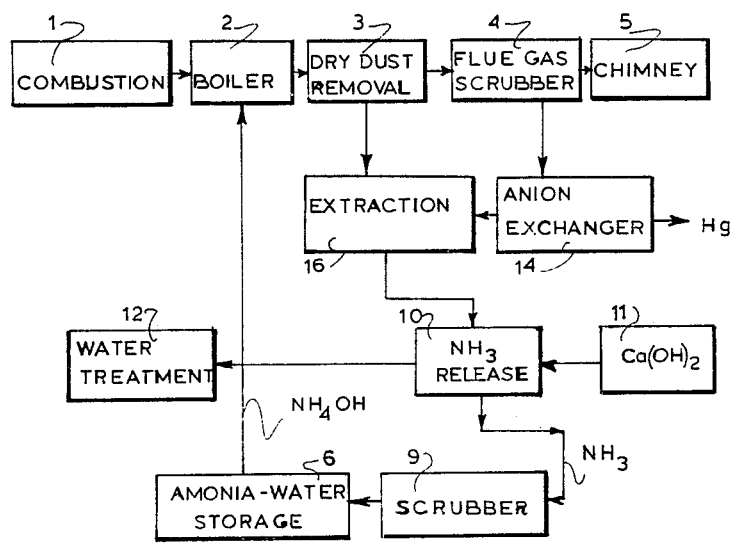

In the variant of FIG. 4, the flyash removed in the dry separator 3 is treated in the extractor 16 with an acid extracting liquid which can be branched from the circulation of scrubber 4. Upon separation of solids from the extracting solution, the ammonium ion-enriched extracting agent is supplied to the heated stripper 10 to transform the ammonia to the gas phase as described in connection with FIG. 1.

We claim:

1. A method of eliminating nitrogen oxides from a flue gas produced by combustion, which comprises the steps of:
   (a) introducing ammonia water into said flue gas and effecting a selective reduction of said nitrogen oxides with ammonia of said ammonia water in a reaction zone downstream of the introduction of the ammonia water into said flue gas;

(b) recovering an ammoniacal component selected from the group which consists of unreacted ammonia and ammonium reaction products from the flue gas downstream of said reaction zone, said recovery occurring through treatment of the flue gas to remove unreacted ammonia and any reaction product incorporating ammonia by means selected from the group consisting of scrubbing with liquid medium, scrubbing in a gas phase and combination thereof;

(c) transforming said component into an aqueous ammoniacal solution, and having an acid added thereto;

(d) feeding said aqueous ammoniacal solution into a supply vessel containing said ammonia water; and (e) supplying to step (a) and the flue gas, the said ammonia water introduced into said flue gas from said supply vessel.

2. The method defined in claim 1 which comprises in step (b), the steps of:
($b_1$) scrubbing gaseous ammonia from the flue gas with an aqueous scrubbing liquid in a scrubbing zone, and
($b_2$) driving ammonia from said scrubbing liquid into a gas phase; and
in step (c), the step of scrubbing ammonia from said gas phase with water to which an acid is added to form said ammoniacal solution.

3. The method defined in claim 1 which comprises in step (b), the steps of:
($b_3$) collecting flyash from said flue gas, and
($b_4$) driving ammonia from the recovered flyash by a heating thereof into a gas phase; and
in step (c), the step of scrubbing ammonia from said gas phase with water to which an acid is added to form said ammoniacal solution.

4. The method defined in claim 2 which comprises the steps of:
collecting flyash from said flue gas,
driving ammonia from the recovered flyash by a heating thereof into a gas phase, and
introducing ammonia of the gas phase into said flue gas upstream of said scrubbing zone.

5. The method defined in claim 2, further comprising the step of introducing scrubbing liquid from which ammonia has been driven in step ($b_2$) into said flue gas for evaporation therein upstream of said scrubbing zone.

6. The method defined in claim 4 wherein said heating of the flyash is effected in an indirect heating to a temperature of 250° C. to 500° C. under an oxygen deficiency.

7. The method defined in claim 6 wherein said heating of the flyash is effected in an atmosphere having an oxygen content of less than 2 volume percent.

8. The method defined in claim 4 wherein said heating of the flyash is effected in a direct heating with a hot carrier gas.

9. The method defined in claim 3 wherein said heating of the flyash is effected in an indirect heating to a temperature of 250° C. to 500° C. under an oxygen deficiency.

10. The method defined in claim 9 wherein said heating of the flyash is effected in an atmosphere having an oxygen content of less than 2 volume percent.

11. The method defined in claim 9 wherein said heating of the flyash is effected in a direct heating with a hot carrier gas.

12. The method defined in claim 1 wherein in step (b), flyash is recovered from said flue gas, ammonium compounds are extracted from the recovered flyash by an extracting liquid, ammonia in said extracting liquid is driven into a gas phase, and ammonia is scrubbed from said gas phase with acidified water to form said ammoniacal solution.

13. The method defined in claim 12 which comprises in step (b), the steps of:
($b_1$) scrubbing gaseous ammonia from the flue gas with an aqueous scrubbing liquid in a scrubbing zone, and
($b_2$) driving ammonia from said scrubbing liquid into a gas phase; and
in step (c), the step of scrubbing ammonia from said gas phase with water to which an acid is added to form part of said ammoniacal solution, a portion of said scrubbing liquid being branched to form said extracting liquid.

14. The method defined in claim 13 wherein step ($b_2$) is effected by heating said scrubbing liquid to a temperature of at least 60° C. for a period of at least 30 minutes while ensuring a pH of the scrubbing liquid of at least 10.

15. The method defined in claim 14 wherein said period is 50 to 70 minutes.

16. The method defined in claim 2 wherein step ($b_2$) is effected by heating said scrubbing liquid to a temperature of at least 60° C. for a period of at least 30 minutes while ensuring a pH of the scrubbing liquid of at least 10.

17. The method defined in claim 16 wherein said period is 50 to 70 minutes.

* * * * *